United States Patent [19]

Fahrbach et al.

[11] 4,001,350

[45] Jan. 4, 1977

[54] BLOCK AND GRAFT COPOLYMERS

[75] Inventors: Gerhard Fahrbach, Plankstadt; Erhard Seiler, Freiburg; Karl Gerberding, Ludwigshafen, all of Germany

[73] Assignee: BASF Aktiengesellshaft, Ludwigshafen (Rhine), Germany

[22] Filed: Dec. 30, 1974

[21] Appl. No.: 537,119

[30] Foreign Application Priority Data

Jan. 15, 1974 Germany ............................ 2401629

[52] U.S. Cl. ...................... 260/880 B; 260/880 R
[51] Int. Cl.² ........................................... C08L 9/06
[58] Field of Search .................... 260/880 B, 880 R

[56] References Cited

UNITED STATES PATENTS

| | | | |
|---|---|---|---|
| 3,078,254 | 2/1963 | Zelinski | 260/880 B |
| 3,135,716 | 6/1964 | Uraneck | 260/880 B |
| 3,265,765 | 8/1966 | Holden | 260/880 B |
| 3,280,084 | 10/1966 | Zelinski | 260/880 B |
| 3,448,175 | 6/1969 | Doak | 260/880 R |
| 3,463,833 | 8/1969 | Isogawa | 260/880 R |
| 3,637,554 | 1/1972 | Childers | 260/880 B |
| 3,639,521 | 2/1972 | Hsieh | 260/880 B |
| 3,652,724 | 3/1972 | Shimomura | 260/880 B |
| 3,699,190 | 10/1972 | Shimomura | 260/880 B |
| 3,721,724 | 3/1973 | Uebele | 260/880 R |
| 3,739,042 | 6/1973 | Chu | 260/880 B |
| 3,819,766 | 6/1974 | Hata | 260/880 B |

FOREIGN PATENTS OR APPLICATIONS

| | | |
|---|---|---|
| 2,163,633 | 6/1972 | Germany |

*Primary Examiner*—Paul R. Michl
*Attorney, Agent, or Firm*—Johnston, Keil, Thompson & Shurtleff

[57] ABSTRACT

Block or graft copolymers consisting of a substantially linear elastomer block B and one or more copolymer blocks A of alternating structure. The ends of block B are joined to the blocks A by divinyl- or divinylidene-aromatic monomer units. The block or graft copolymers may be used as impact-resistant thermoplastic molding compositions for the manufacture of shaped articles or as emulsifiers in the solution graft polymerization of styrene and acrylonitrile to a rubber.

14 Claims, No Drawings

BLOCK AND GRAFT COPOLYMERS

This application discloses and claims subject matter described in German Patent Application P 24 01 629.3, filed Jan. 15, 1974, which is incorporated herein by reference.

This invention relates to block or graft copolymers of elastomer blocks B and copolymer blocks A of alternating structure, which blocks are joined together by divinyl- or divinylidene-aromatic monomer units.

German Published Application 2,163,633 describes graft copolymers in which an elastomer substrate B is joined to side chains of copolymers A of alternating structure. These graft copolymers are produced by polymerization of mixtures of polar vinyl monomers and vinyl-aromatic monomers onto the elastomer substrate in the presence of a metal compound acting as a chelating agent for the polar monomer. This process has the drawback that the degree of grafting is very low, this having a detrimental effect on the toughness and strength of the products. Furthermore, all of the products obtained according to the Examples of the said German Published Application have a very high gel content and are therefore unsuitable for a number of applications, for example for use as emulsifiers in the solution graft polymerization of styrene and acrylonitrile on polybutadiene.

It is an object of the invention to provide gel-free block or graft copolymers showing a high degree of grafting.

We have found that this object is achieved by causing the elastomer block B to be joined to the copolymer blocks A via divinylaromatic or divinylidene-aromatic monomer units.

The elastomer block B is essentially linear and has a molecular weight of from 10,000 to 1,000,000 and preferably from 40,000 to 500,000. It is produced by polymerization of anionically polymerizable monomers b, such as butadiene or isoprene, which are polymerized alone, in admixture with each other or in admixture with up to 50% w/w of other monomers such as styrene. This polymerization is preferably carried out at temperatures of from 0° to 100° C in organic solvents, such as benzene, toluene, ethylbenzene and cyclohexane. The ionic initiators used may be both monofunctional initiators such as butyl lithium and bifunctional initiators such as naphthalene sodium and naphthalene potassium and tetrameric α-methyl styrene potassium, the amounts used being from 0.01 to 1 milliequivalents per mol of monomer b. In the first case the polymer block B has one living chain end, whilst in the second case it has two living ends.

In a second step, divinyl-aromatic or divinylidene-aromatic monomers are graft polymerized to these living chains, examples being divinyl benzene, diisopropenyl benzene, vinylisopropenyl benzene and other compounds in which one of the vinyl or vinylidene groups is not situated directly on the aromatic nucleus, for example p-styrylvinyl ether. The reaction is conveniently carried out in the same solvent as the reaction of the first stage and, if desired, small amounts of polar compounds such as tetrahydrofuran may be added. In this stage, the temperature is preferably from −20° to +30° C. The divinyl-aromatic or divinylidene-aromatic compound is used in amounts of from 1 to 20 and preferably from 2 to 6 mols per equivalent of the initiator used in the first stage so that only a very small number of monomer units become attached to the polymer block B.

It would seem that when diisopropenyl benzene and vinyl-isopropenyl benzene are used, only one of the two double bonds is capable of anionic polymerization with the result that hardly any crosslinking takes place. When use is made of divinyl benzene the risk of crosslinking is greater, and to suppress this it it preferred to use small amounts, i.e. only from, say, 1 to 4 mols per equivalent of initiator, and no tetrahydrofuran is added.

It is also possible to use the divinyl or divinylidene compound during the butadiene polymerization if desired.

The living chain ends are then terminated, for which purpose use may be made of conventional hydrogen-acid chain stoppers such as water, carboxylic acid, mineral acids and alcohols.

In a third process step, the monomers $a$ and $a'$ are added for formation of the copolymer blocks A. Suitable monomers $a$, which bear one polar group, are for example acrylonitrile, methylmethacrylate, methacrylonitrile, acrylates of alcohols of from 1 to 4 carbon atoms, acrylic acid, methacrylic acid and vinyl ketones. Preferred monomers $a'$, which bear one phenyl group, are styrene, α-methyl styrene or both; alternatively, use may be made of α-butyl styrene or chlorinated styrenes if desired.

The amount of mixture $a + a'$ may be from 0.05 to 100 parts by weight per part of elastomer block B. When producing impact resistant molding compositions it is preferred to use from 5 to 50 parts by weight, whereas from 0.25 to 2.5 parts by weight are used in the manufacture of emulsifiers. The molar ratio of $a$ to $a'$ is preferably 1:1, although an excess of one or other of the components is not detrimental.

In order to obtain copolymer blocks A showing an alternating structure of monomer units, the polymerization must be carried out in the presence of Lewis acids acting as chelating agents for the polar monomers $a$. To this end we preferably use metal compounds of zinc, cadmium, magnesium, tin or aluminum, for example zinc chloride, diethylaluminum chloride, ethylaluminum dichloride or ethylaluminum sesquichloride. The amount of chelating agent used per mole of monomer $a$ is from 0.01 to 10 moles and preferably from 0.05 to 1 mole. If desired, conventional free-radical initiators may also be used, for example, organic peroxides or azo compounds in amounts of from 0.0001 to 0.01 mole per mole of monomers $a + a'$. This increases the rate of polymerization. The temperature at which polymerization is carried out is from 0° to 100° C and preferably from 0° to 70° C. This polymerization is conveniently carried out in the same solvent as the previous reaction. Alternatively, the polymerization may be carried out in bulk or in chlorinated hydrocarbons. Yet another method is to effect polymerization initially in solution and then to suspend the solution in water with the addition of dispersing agents and to complete the polymerization in this medium.

In the alternating copolymerization, the co-ordinated polar monomer $a$ acts as acceptor and the monomer $a'$ as donator. At the commencement of polymerization, one acceptor molecule settles on a donator group situated at the chain end of the elastomer block B and initiates polymerization at that point. If a very large quantity of monomer $a + a'$ relative to the elastomer block B is used, conventional graft polymerization may also occur, to a minor extent, on the chain of the elastomer block B. However, this has no substantial effect on the properties of the product.

The block or graft copolymers produced in the manner of the invention may be used as impact-resistant thermoplastic molding compositions for the manufacture of shaped articles. Products showing a relatively low degree of grafting may also be used as emulsifiers in the solution graft polymerization of styrene and acrylonitrile on a rubber.

In the following Examples, the parts and percentages are by weight.

EXAMPLE 1

400 parts of butadiene are polymerized to completion in 2000 parts of dry toluene at from 40° to 50° C using 0.5 part of butyl lithium in 80 parts of hexane. The viscosity number of a sample is found to be 90. There are then added, at +10° C, 5.5 parts of diisopropenyl benzene in 50 parts of dried tetrahydrofuran. The mixture is precipitated in methanol after 30 minutes. There are thus produced 400 parts of soluble polymer, of which the viscosity number is now 95.

A solution of 40 parts of this polymer in 1000 ml of toluene is heated under nitrogen for 8 hours at 55° C together with 187 parts of styrene and 106 parts of acrylonitrile with the addition of 13.6 parts of zinc chloride and 0.4 part of azo diisobutyronitrile. The mixture is precipitated in methanol and recrystallized from a mixture of chloroform and methanol. Unreacted homopolybutadiene is removed by extraction with hexane. There are produced 104 parts of soluble block copolymer containing 23.2% of butadiene and 76.8% of styrene/acrylonitrile.

EXAMPLE 2

450 parts of butadiene and 5 parts of vinylisopropenyl benzene are polymerized to completion at from 40° to 50° C in 1500 parts of toluene using 0.5 part of butyl lithium in 80 parts of hexane. There are obtained 450 parts of soluble polymer having a viscosity number of 121.

A solution of 40 parts of this polymer in 100 parts of toluene is stirred for 24 hours at room temperature together with 187 parts of styrene and 106 parts of acrylonitrile and 90 parts of 25% ethylaluminum sesquichloride at 0° C. After working up, there are obtained 150 parts of block copolymer containing 21% of butadiene.

EXAMPLE 3

450 parts of butadiene are added, over 30 minutes, to 25 parts of a molar solution of tetra-α-methyl styrene potassium in 2000 parts of tetrahydrofuran such that the temperature does not exceed 30° C. There are then added 10 parts of diisopropenyl benzene in 90 parts of tetrahydrofuran. After stirring for 20 minutes, the mixture is precipitated in methanol. There are obtained 460 parts of a soluble polymer having a viscosity number of 133.

40 parts of this polymer are reacted with styrene and acrylonitrile in the manner described in Example 2. There are obtained 145 parts of a block copolymer having a butadiene content of 25%.

We claim:
1. Block or graft copolymers consisting essentially of
   1. A substantially linear elastomer block B having a molecular weight of from 10,000 to 1,000,000, said block being formed from units of anionically polymerizable monomers $b$; and
   2. one or more copolymer blocks A of alternately polymerized monomers $a$ and $a'$, of which $a$ has a polar group and $a'$ a phenyl group, said ends of said block B being joined to blocks A via one or more monomer units of aromatic nuclei bearing nonvinyl groups or vinylidene groups.

2. Block or graft copolymers as set forth in claim 1 wherein said monomer $b$ is butadiene and wherein said monomer $a$ is acrylonitrile and said monomer $a'$ is styrene.

3. Block or graft copolymers as set forth in claim 2 wherein said block B is joined to block A via one or more divinyl benzene units.

4. Block or graft copolymers as set forth in claim 1, wherein the elastomer block B forms a molecular weight of from 40,000 to 500,000.

5. Block or graft copolymers as set forth in claim 1, wherein the elastomer block B consists of butadiene and/or isoprene and, if desired, up to 50% by weight of other monomers.

6. Block or graft copolymers as set forth in claim 1, wherein the anionically polymerizable monomer b is butadiene.

7. Block or graft copolymers as set forth in claim 1, wherein the monomers a of the copolymer blocks A are selected from the group consisting of acrylonitrile, methacrylonitrile, methylmethacrylate, acrylates of alcohols of from 1 to 4 carbon atoms, acrylic acid, methacrylic acid and vinyl ketones.

8. Block or graft copolymers as set forth in claim 1, wherein the monomers a' of the copolymer blocks A are styrene, side-chainsubstituted styrenes and nuclear-substituted styrenes.

9. Block or graft copolymers as set forth in claim 1, wherein the ratio of the copolymer blocks A to the elastomer block B in the block or graft copolymers is from 0.05:1 to 100:1, by weight.

10. Block or graft copolymers as set forth in claim 1, wherein the ratio of the copolymer blocks A to the elastomer block B in the block or graft copolymers is from 0.25:1 to 2.5:1, by weight.

11. Block or graft copolymers as set forth in claim 1, wherein the ratio of the copolymer blocks A to the elastomer block B in the block or graft copolymers is from 5:1 to 50:1, by weight.

12. Block or graft copolymers as set forth in claim 1, wherein the elastomer block B is joined to the copolymer blocks A via one or more monomer units of divinyl benzene, diisopropenyl benzene, vinylisopropenyl benzene or p-styrylvinyl ether.

13. A process for the manufacture of block or graft copolymers as set forth in claim 1, comprising the steps of:
   I. polymerizing monomers b in the presence of from 0.01 to 1 milliequivalent of a mono- or bi-functional anionic initiator,
   II. reacting the living chain ends with from 1 to 10 moles of a divinyl-aromatic, vinyl/vinylidene-aromatic or divinylidene-aromatic monomer per mole of initiator,
   III. terminating the chain ends by the addition of a hydrogen-acid compound,
   IV. adding a mixture of from 0.05 to 100 parts by weight, based on one part by weight of the elastomer block B, of a mixture of monomers $a$ and $a'$, preferably in a molar ratio of approximately 1:1, and V. polymerizing the mixture in the presence of from 0.01 to 10 moles of a Lewis acid acting as chealting agent, per mole of monomer a, at temperatures of from 0° to 100° C.

14. A process as set forth in claim 3 wherein in step V, the mixture is polymerized in the presence of free radical initiators.

* * * * *